United States Patent [19]
Dehrmann et al.

[11] Patent Number: 5,813,227
[45] Date of Patent: Sep. 29, 1998

[54] HYDROKINETIC TORQUE CONVERTER WITH STABILIZER RING ON THE BLADE WHEELS

[75] Inventors: Uwe Dehrmann, Würzburg; Wilfried Glock, Dittelbrunn; Rüdiger Hinkel, Röthlein-Heidenfeld; Ruthard Schneider, Bad Königshofen; Peter Volland, Rannungen; Reinhold Weckesser, Sennfeld; Hans-Wilhelm Wienholt, Schweinfurt, all of Germany

[73] Assignee: Fichtel & Sachs AG, Schweinfurt, Germany

[21] Appl. No.: 738,229

[22] Filed: Oct. 25, 1996

[30] Foreign Application Priority Data

Oct. 26, 1995 [DE] Germany ............... 195 39 814.4

[51] Int. Cl.⁶ .................................................... F16D 33/00
[52] U.S. Cl. ................................ 60/367; 60/361; 60/364
[58] Field of Search ............................... 60/361, 362, 365, 60/364, 366, 367

[56] References Cited

U.S. PATENT DOCUMENTS

| | | |
|---|---|---|
| 2,235,672 | 3/1941 | Dodge ........................................ 60/367 |
| 2,324,693 | 7/1943 | Griswold et al. ......................... 60/362 |
| 2,652,782 | 9/1953 | Herndon et al. .......................... 60/366 |
| 2,952,976 | 9/1960 | Alexandrescu ............................ 60/366 |
| 3,167,917 | 2/1965 | Alexandrescu ............................ 60/361 |
| 3,167,918 | 2/1965 | Alexandrescu . | |
| 3,192,862 | 7/1965 | Schrader, Jr. . | |
| 3,287,908 | 11/1966 | Mamo . | |
| 5,191,804 | 3/1993 | Genise . | |
| 5,251,503 | 10/1993 | Morris et al. . | |

FOREIGN PATENT DOCUMENTS

| | | |
|---|---|---|
| 0365033 | 4/1990 | European Pat. Off. . |
| 2390634 | 12/1978 | France . |
| 1068080 | 10/1959 | Germany . |
| 1284802 | 12/1968 | Germany . |
| 2850577 | 6/1979 | Germany . |
| 3938724 | 5/1991 | Germany . |
| 54-14261 | 6/1979 | Japan . |
| 62-179459 | 11/1987 | Japan . |
| 63-101360 | 7/1988 | Japan . |
| 3144152 | 6/1991 | Japan . |
| 0547887 | 12/1993 | Japan . |
| 70873308 | 3/1995 | Japan . |
| 7127708 | 5/1995 | Japan . |
| 0821510 | 1/1996 | Japan . |
| 0442363 | 2/1936 | United Kingdom . |
| 1399369 | 7/1975 | United Kingdom . |
| 1400737 | 7/1975 | United Kingdom . |
| 2214248 | 8/1989 | United Kingdom . |
| 2280004 | 1/1995 | United Kingdom . |
| 8805510 | 7/1988 | WIPO . |

*Primary Examiner*—F. Daniel Lopez
*Attorney, Agent, or Firm*—Nils H. Ljungman and Associates

[57] ABSTRACT

Hydrodynamic torque converter which comprises blade wheels in the form of a reactor, a pump wheel and a turbine wheel with individual blades which are connected to an outer wall, whereby a torque can be transmitted from the pump wheel to the turbine wheel by means of pressure medium which flows along a flow path from the pump wheel to the turbine wheel, and is transported via the reactor back to the pump wheel, whereby at least one blade wheel comprises at least one stabilizer ring which creates a connection of the individual blades on their exposed sides, and by means of which stabilizer ring the flow path of the pressure medium can be influenced to reduce the flow losses.

20 Claims, 3 Drawing Sheets

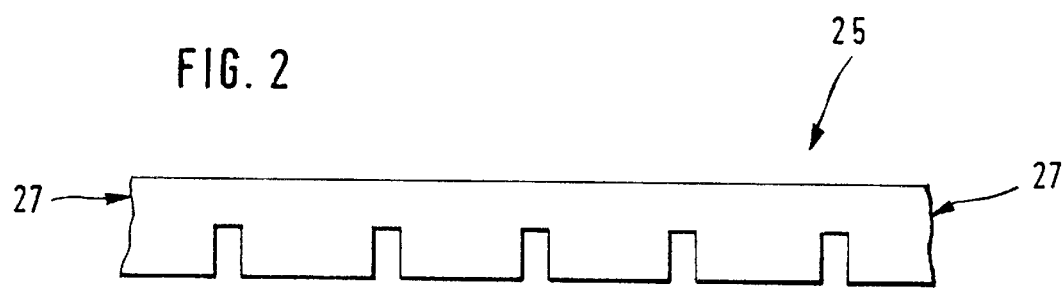
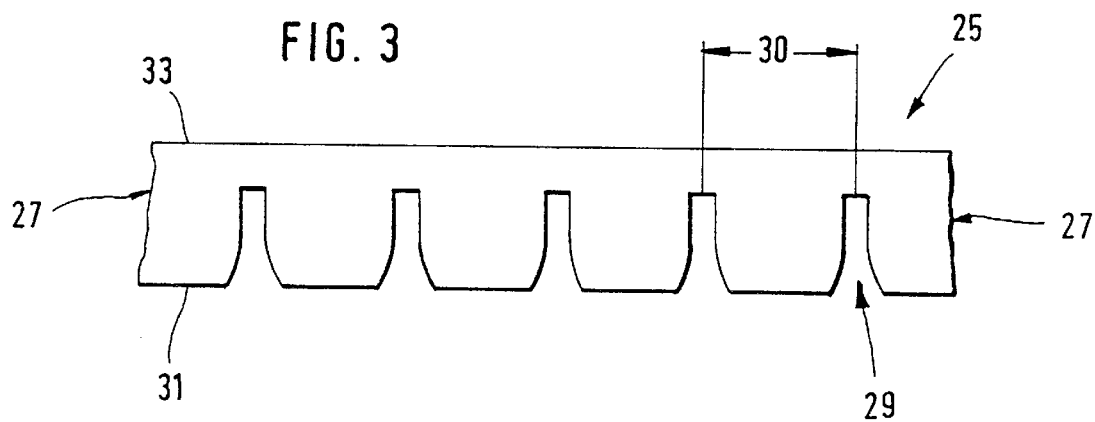

HYDROKINETIC TORQUE CONVERTER WITH STABILIZER RING ON THE BLADE WHEELS

BACKGROUND OF THE INVENTION

1. Field of the Invention

The present invention relates to a hydrokinetic torque converter including blade wheels in the form of a reactor or stator, pump wheel and turbine wheel with individual blades. The blade wheels are connected with an outer wall by which a torque can be transmitted from the pump wheel to the turbine wheel and returned to the pump wheel via the stator.

2. Background Information

P 39 38 724.0, for example, describes a known hydrokinetic or hydrodynamic torque converter in which the blades of the blade wheel are connected to a radially inner wall and to a radially outer wall. Together, these walls form an inner and outer torus, whereby the inner torus is formed by the radially inner wall of the pump and turbine wheel and the radial outer wall of the reactor. This inner torus connects the individual blades of a blade wheel so that the distance between the individual blades is fixed, as a result of which the blade wheel is very stable. Furthermore, the flow path of the hydraulic fluid through the inner torus is for the most part restricted to an area between the inner and outer torus.

One disadvantage of the hydrodynamic torque converter with a fixed inner torus is that a large number of manufacturing steps and a large amount of material are required to manufacture it, first to appropriately shape the material and then to non-detachably connect it to the blades.

OBJECT OF THE INVENTION

The object of the invention is to reduce the amount of material required, as well as the weight and the number of operating steps which are necessary to manufacture the torque converter.

SUMMARY OF THE INVENTION

The invention teaches that this object can be accomplished by having at least one blade wheel with at least one stabilizer ring which creates a connection of the individual blades on their exposed sides and by which the stabilizer ring can influence the flow path of the hydraulic medium to reduce flow losses.

As a result of the measure of the stabilizer ring, the blades of a blade wheel can be connected on their exposed side, as a result of which, on one hand, the required stability of the blade wheel can be achieved, and on the other hand the flow path is stabilized which can achieve reduced flow losses. The stabilization of the flow of the hydraulic medium on the desired path is also an important function of the stabilizer rings, because the efficiency of the torque converter depends to a great extent on such a stabilization. As a result of centrifugal force, the pressure medium can flow radially outward from the rotating pump wheel. In the radially outer area, the hydraulic medium can be deflected by the pump wheel blades and can flow into the turbine wheel which is driven by this fluid current. A torque can thereby be transmitted to the turbine wheel. If the stabilizer ring is located on the pump wheel, for example, the purpose of the stabilizer ring can be to deflect the flow path of the hydraulic fluid so that the greatest possible torque can be transmitted. As a result of the advantages described above, it can be advantageous to use a plurality of stabilizer rings. A stabilizer ring can be used on each blade wheel, which means that it may be necessary to determine on which blade wheels the use of the stabilizer rings is particularly advantageous. When at least three stabilizer rings are used, the inner torus can be replaced entirely by these three stabilizer rings.

It can be particularly advantageous to create a positive or interlocking connection between the stabilizer ring and the blades of a blade wheel by means of recesses in the respective stabilizer ring, which recesses are provided for the location of blades. A greater load can be applied to these connections than to a connection between the stabilizer ring and blade, which latter connection is made essentially only by soldering and welding. These recesses are provided on the side of the stabilizer ring facing the blade wheel. The stabilizer rings can thereby be placed over the blade wheels. The position of the blade wheels can therefore be fixed, which simplifies the fabrication process. Soldering, welding, brazing or riveting may sometimes be necessary at the contact points. Suitable primary material which can be used for the manufacture of the stabilizer rings includes a metal sheet from which metal strips are obtained, for example by cutting or stamping. These metal strips can be formed into a ring shape by connecting the two ends. During the manufacture of the metal strips, the recesses provided can be produced during the stamping or cutting step.

The stabilizer rings can also be manufactured using other technologies. For example, casting can be used to manufacture the stabilizer ring of the reactor. When the reactor is manufactured by casting, the stabilizer ring of the reactor can be economically produced at the same time as the manufacture of the reactor, e.g. by using radial and axial mold slides.

The invention teaches that it can be particularly advantageous to adjust the stabilizer ring by shaping it to fit the site where it is to be installed. In particular, the efficiency of the hydrodynamic torque converter can be increased by means of the variation of the radius of the stabilizer ring in the axial direction. By means of corresponding curves, the flow can be steered into the desired path. Particularly common cross-section shapes are the L-shape or elbow-shape and the U-shape. The use of a stabilizer ring with an L-shaped cross section can be advantageous on the pump wheel and the turbine wheel. In some applications (e.g. to facilitate startup), the use of stabilizer rings which have a constant radius in the axial direction can be sufficient. The U-shaped cross section shape can be particularly advantageous for the reactor to stabilize the flow path of the hydraulic medium. The use on the reactor or stator of an L-shaped stabilizer ring which is easy to manufacture and assemble, but which no longer creates an optimal flow path for the hydraulic medium and consequently results in reduced efficiency, has been sufficient in a few applications. Such stabilizer rings which have a varying radius in the axial direction can be manufactured, for example, by bending or rolling the metal sheet along its long side before it is closed into a ring. A U-shaped stabilizer ring can also be manufactured by connecting two L-shaped stabilizer rings along their axial edges which face one another.

Essentially, all that is required on the pump wheel is a stabilizer ring, which stabilizer ring has a constant radius and is oriented almost axially parallel with the axis of rotation of the converter.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is illustrated in the accompanying drawings and is described in greater detail below.

FIG. 2 shows a stabilizer ring in the rolled shape;

FIG. 3 is the same as FIG. 2, except that it has recesses suitable for rolling.

DESCRIPTION OF THE PREFERRED EMBODIMENT

Figure 1:
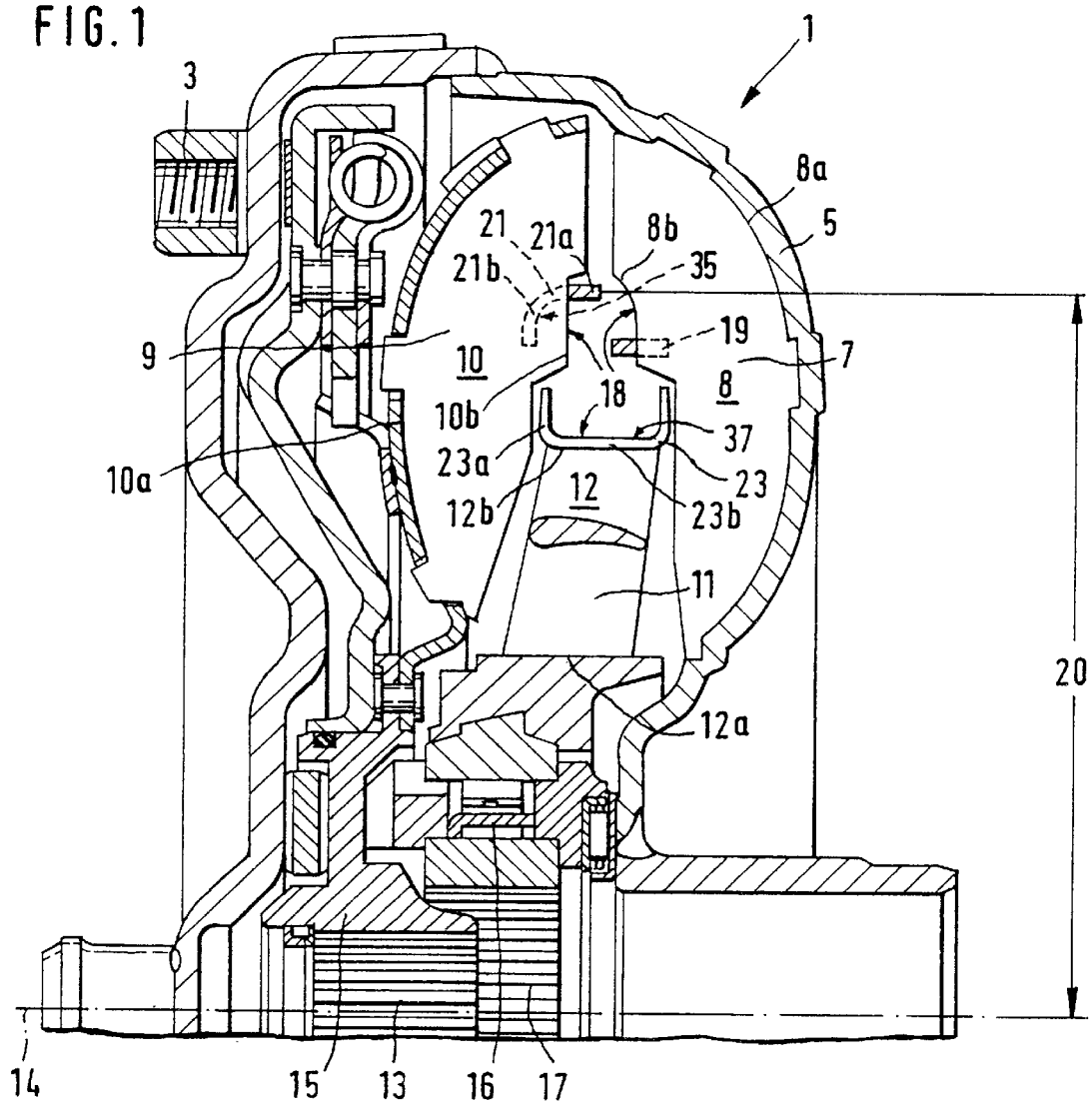
FIG. 1 shows the upper half of a section through a hydrodynamic torque converter which has three stabilizer rings.

The basic construction of a hydrodynamic torque converter 1 is described below with reference to the embodiment illustrated in FIGS. 1 and 1a. The illustrated torque converter 1 comprises a pump wheel 7, a turbine wheel 9 and a reactor 11, which, for their part, each comprise individual blades 8, 10, 12, respectively. The blades 8, 10, 12 are each fixed on two sides 8a, 8b; 10a, 10b; 12a, 12b. On the one side 8a, 10a, 12a the blades are non-detachably connected to a wall, whereby the sum of the blade wheel walls forms a torus.

In an embodiment, the wall referred to above can be the housing 5 of the hydrodynamic torque converter 1.

The blades 8, 10, 12 lie inside the torus volume defined by the walls. One of the stabilizer rings 19, 21, 23 is located on each of the respective sides 8b, 10b, 12b of the blades 8, 10, 12 opposite these walls. The stabilizer rings 19, 21 are non-detachably connected to the blades 8, 10 of the respective blade wheel 7, 9 by positive connections which are created by means of recesses 29 (see FIG. 3) in the stabilizer rings 19, 21. The distance 30 between the recesses 29 in the stabilizer rings essentially equals the distance between the edges 8b, 10b of the blades located in these recesses, when the respective blade wheel 7, 9 is at rest.

In accordance with an embodiment of the present invention, the distance 30 can be the distance between two adjacent blade edges.

The cross-section shapes of the individual stabilizer rings 19, 21, 23 vary with the requirements set for the specific application. In this case, the cross-section of the stabilizer ring 19 of the pump wheel 7 is rectangular and runs axially parallel to the axis of rotation 14 of the converter 1. On the other hand, the cross-section of the turbine stabilizer ring 21 is L-shaped. Thus, the leg 21b runs essentially perpendicular to the axis of rotation 14 of the converter 1 and leg 21a runs essentially parallel to the axis of rotation 14 of the converter 1. The stabilizer ring 23 of the reactor 11 can have a U-shaped cross-section, whereby the U is open toward the radial outside, and the segment 23b of the stabilizer ring 23 which runs axially parallel entirely covers the limiting edges 12b of the reactor blades 12.

In accordance with an embodiment of the present invention, a space 17 can represent a space for a support shaft, which support shaft could have teeth for engaging with the gear teeth 105.

In accordance with an embodiment of the present invention, the turbine hub 15 is located where the turbine wheel 9 connects to the output shaft 13.

The function of the hydrodynamic torque converter 1 illustrated in FIG. 1 is described briefly below. The hydrodynamic torque converter 1 is capable of converting (transmitting) both the torque and the speed of rotation of the drive motor to the output shaft 13 of the turbine wheel 9. By means of the driver 3, which is non-rotationally connected to the converter housing 5, the pump wheel 7 is rotated at the speed of the motor. As a result of the rotational movement, the hydraulic fluid between the blades 8 is pushed outward by centrifugal force. The flow path dictated by centrifugal force and the shape of the blade is assisted by the stabilizer ring 19 of the pump wheel 7. The turbine wheel 9 converts the flow energy of the hydraulic fluid into a torque by deflecting it into the strongly curved turbine wheel blades 10, whereby an escape of the hydraulic fluid toward the radial inside is prevented by the stabilizer ring 21. The reactor 11 sits on the freewheel mechanism 16 between the turbine wheel 9 and the pump wheel 7. The reactor 11 can only rotate in the same direction of rotation as the converter housing 5, i.e. in the same direction of rotation as the motor. The flow of hydraulic medium coming from the turbine wheel 9 strikes the reactor 11. Since the reactor blades 12 are curved opposite to the direction of flow of the hydraulic fluid, and the reactor 11 offers resistance as a result of the blocked freewheel mechanism 16, the hydraulic fluid is deflected and is transported to the pump wheel 7 at a favorable angle. The lateral escape of the hydraulic fluid in the axial direction is prevented by the stabilizer ring 23 of the reactor 11. The different cross-section shapes of the stabilizer rings 19, 21, 23 result from the requirements set for them.

In this manner, a torque conversion is achieved which is greater, the greater the difference in speed between the pump wheel 7 and the turbine wheel 9. Thus the torque conversion is greatest during startup. As the speed of rotation of the turbine wheel 9 increases, the flow path becomes increasingly flatter as a result of the superimposition of the rotational movement of the turbine wheel 9 on the inflow direction of the hydraulic fluid. The torque increase thereby occurs continuously. As the speed difference between the pump wheel 7 and the turbine wheel 9 decreases, the flow path of the hydraulic fluid changes until the reactor blades 12 are impacted by the flow on the reverse side. At that point, the reactor 11 then begins to rotate in the same direction as the turbine wheel 9 and the pump wheel 7. The blocking action of the freewheel mechanism 16 in one direction is neutralized.

In accordance with an embodiment of the present invention, the stabilizer rings can preferably be manufactured from a metal strip which is formed into a ring by connecting the two ends 27 of the metal strip as depicted in FIG. 2.

In accordance with an embodiment of the present invention, the stabilizer rings 21, 23 can have a varying radius 20 in the axial direction.

In accordance with an embodiment of the present invention, the varying radius 20 in the axial direction can be created by bending or rolling one or both of the longitudinal sides 31, 33 of the metal strip 25 as shown in FIG. 3.

Figure 1A:
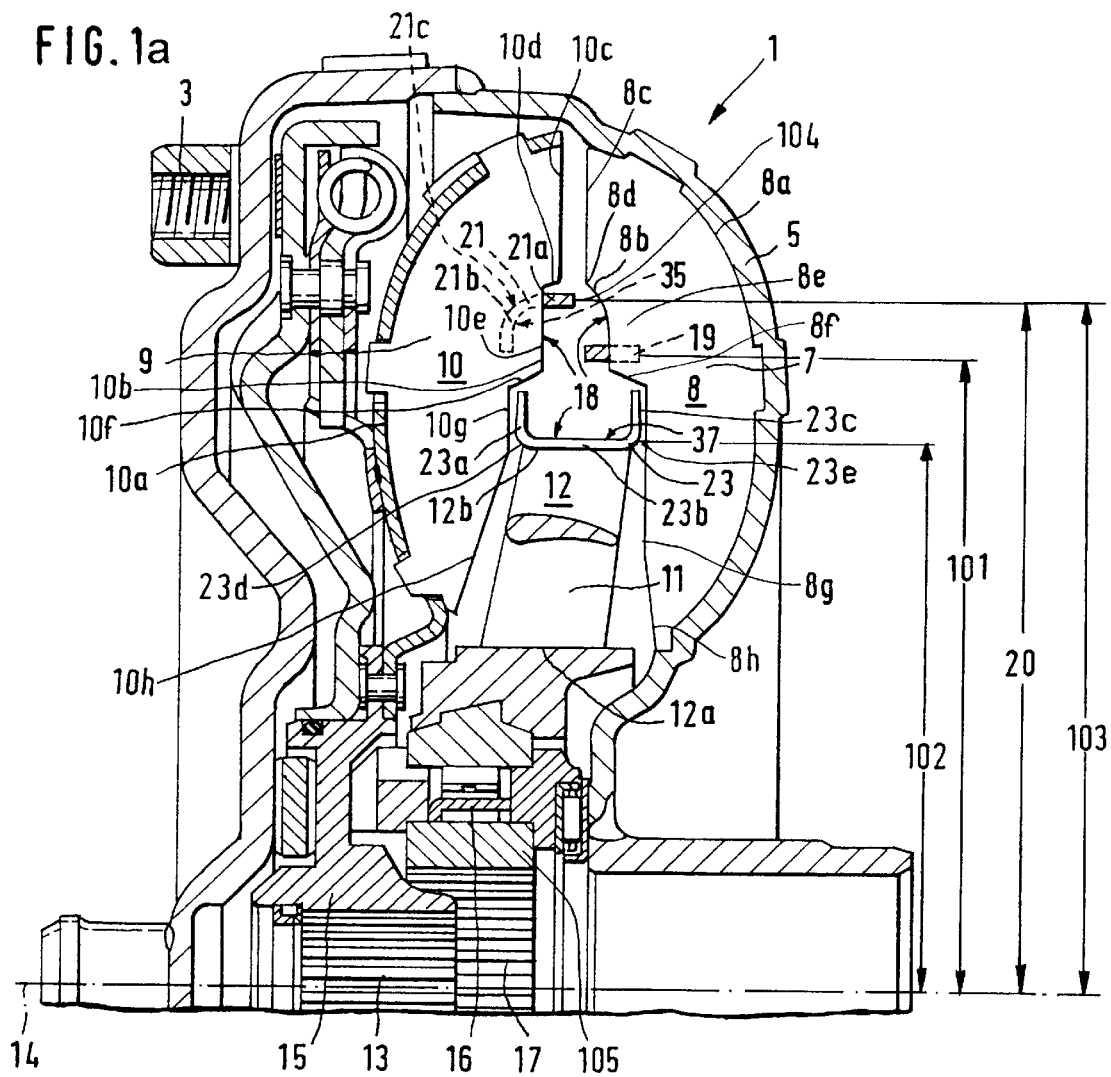
FIG. 1a shows the same cross section as depicted in FIG. 1, with additional components indicated.

In accordance with an embodiment of the present invention, the stabilizer rings 19, 21, 23, each have a relative distance 101, 103, 102, respectively, from the axis of rotation 14 of the torque converter 1 as shown in FIG. 1a. There can be an L-shaped stabilizer ring 21 which has a radial distance 103 from the axis of rotation 14, and another stabilizer ring 19 which has a radial distance 101 from the axis of rotation 14. There can also be a U-shaped stabilizer ring 23 having a distance (defined from the bottom of the U) 102 from the axis of rotation 14. in addition, the pump wheel blades 8 have a side 8b which can be divided into sections 8c, 8d, 8e, 8f, 8g and 8h. Section 8c of side 8b can proceed linearly from the point on side 8b with the greatest distance from the axis of rotation 14, towards the axis of rotation 14. Section 8d can be a curved section, proceeding from the end of section 8c toward the axis of rotation 14. The radius of curvature 104 of section 8d is defined from a point between the pump wheel blades 8 and the turbine wheel blades 10. The radius of curvature of section 8d can be about 0.27 times the length of section 8c. Section 8e of side 8d can proceed from the end of section 8d nearest the axis of rotation 14, in a manner substantially linearly toward the axis of rotation 14. Section 8e can have a length about 0.4 times the length of section 8c. Stabilizer ring 19, can be located substantially transverse to section 8e. Section 8f can proceed linearly from the end of section 8e nearest the axis of rotation 14 at an obtuse angle from section 8e, and generally toward the outer side of the pump wheel blade 8. Section 8f can have a length about 0.3 times the length of section 8c. Section 8g can proceed generally linearly from the end of section 8f nearest the axis of rotation 14 generally toward the axis of rotation 14. Section 8g can have a length about 1.3 times the length of section 8c. Section 8h can proceed from the end of section 8g nearest the axis of rotation 14, generally linearly toward the axis of rotation 14 and also toward the outer side of pump wheel blade 8. Section 8h can have a length about 0.7 times the length of section 8c.

Stabilizer ring 19 can have a length about 4 times the width of stabilizer ring 19, with the length of stabilizer ring 19 running substantially parallel to the axis of rotation 14.

Further, in accordance with another embodiment of the present invention, the turbine wheel blades 10 can have a side 10b, which can be divided into sections 10c, 10d, 10e, 10f, 10g and 10h. Section 10c can start at the point of side 10b which is furthest from the axis of rotation 14 and proceed generally linearly toward the axis of rotation 14, generally transverse to the axis of rotation 14. Section 10d can proceed from the end of section 10c nearest the axis of rotation 14 and proceed in a direction almost perpendicular to section 10c, but angled somewhat towards the axis of rotation 14. Section 10d can have a length about 0.15 times the length of section 10c. Section 10e can then proceed from the end of section 10d nearest the axis of rotation 14 and proceed toward the axis of rotation 14 essentially transverse to the axis of rotation 14. Section 10e can have a length about 0.65 times the length of section 10c. Leg 21a of stabilizer 21 can cross section 10e substantially transverse to section 10e. Leg 21a of stabilizer 21 can also be essentially parallel to section 10e. Section 10f of side 10b can begin at the end of section 10e nearest the axis of rotation 14 and proceed at an angle from section 10e, generally toward side 10a and the axis of rotation 14. Section 10f can have a length about 0.25 times the length of section 10c. Section 10g can begin at the end of section 10f nearest the axis of rotation 14, and proceed toward the axis of rotation 14, generally transverse to the axis of rotation 14. Section 10g can have a length about 0.5 times the length of section 10c. Section 10h can begin at the end of section 10g nearest the axis of rotation 14 and proceed at an angle from section 10g, generally toward the axis of rotation 14, angled somewhat in the direction of side 10a. Section 10h can have a length about 1.3 times the length of section 10c.

In accordance with an embodiment of the present invention, stabilizer ring 21 can have a leg 21a substantially parallel to the axis of rotation 14 and a leg 21b substantially perpendicular to the axis of rotation 14. Leg 21a can have a length which is about 2.5 times the width of section leg 21a. The length of section 21a can run substantially parallel to the axis of rotation 14. Leg 21b can have a length about 2 times the width of leg 21b, with the length of leg 21b running substantially transverse to the length of leg 21a. The width of legs 21a and 21b can be substantially the same. Section 21c can be a curved section connecting legs 21a and 21b. The radius of curvature of section 21c can be substantially about 1.5 times the width of leg 21a.

In accordance with an embodiment of the present invention, the reactor stabilizer ring 23, which can be designed as a U-shaped stabilizer ring, can have sides 23a and 23c, which can run substantially transverse to the axis of rotation 14, and substantially parallel to section 8g of side 8b, and section 10g of side 10b. Side 23a can also be substantially adjacent a portion of section 10g. Side 23c can be substantially adjacent a portion of section 8g. The U-shaped stabilizer ring can also have a bottom section 23b which can run substantially parallel to the axis of rotation 14. Section 23b can have a length about 13 times the width of section 23b. Sections 23a and 23c can have lengths about 5 times the width of section 23b. Sections 23a and 23c can have widths which are substantially equal to the width of section 23b. Section 23d can be a curved section connecting side 23a and section 23b, and section 23e can be a curved section connecting side 23c and section 23b. Sections 23d and 23e can each have a radius of curvature about 2 times the width of section 23b.

In accordance with an embodiment of the present invention, the distance 101 between the stabilizer ring 19 and the axis of rotation 14 can be about 1.17 times the distance 102 between the bottom 23b of the stabilizer ring 23 and the axis of rotation 14. The distance 103 between leg 21a of the stabilizer ring 21 and the axis of rotation 14, can be about 1.3 times the distance 102 between the bottom 23b of the stabilizer ring 23 and the axis of rotation 14.

In accordance with an embodiment of the present invention, the reactor stabilizer ring 23 can have a side 18 exposed to the interior of the hydrodynamic torque converter 1. Further, the stabilizer ring 23, can be in the form of a U-shaped stabilizer 37.

One feature of the invention resides broadly in the hydrodynamic torque converter 1 which comprises blade wheels 7, 9, 11, in the form of a reactor or stator 11, pump wheel 7 and turbine wheel 9 with individual blades 8, 10, 12, which blade wheels 7, 9, 11 are connected with an outer wall, whereby a torque can be transmitted from the pump wheel 7 to the turbine wheel 9 by means of hydraulic medium which flows along a flow path from the pump wheel 7 to the turbine wheel 9 and is returned to the pump wheel 7 via the reactor 11, characterized by the fact that at least one blade wheel 7, 9, 11 comprises at least one stabilizer ring 19, 21, 23 which creates a connection of the individual blades 8, 10, 12 on their exposed sides 18 and by means of which the flow path of the hydraulic medium can be influenced to reduce flow losses.

Another feature of the invention resides broadly in the hydrodynamic torque converter 1 characterized by the fact that corresponding to the stabilizer ring there is also a second stabilizer ring which creates a connection between the individual blades on their exposed side.

Yet another feature of the invention resides broadly in the hydrodynamic torque converter 1 characterized by the fact that corresponding to at least one of the stabilizer rings 19, 21 there is an additional stabilizer ring 23 which creates a connection of the reactor blades 12 on the radial outside of the reactor blades 12.

Still another feature of the invention resides broadly in the hydrodynamic torque converter 1 characterized by the fact that the stabilizer ring 9, 21, 23 is provided with recesses 29 which are provided for the positive or interlocking holding of blades 8, 10, 12 of the blade wheels 7, 9, 11 on their exposed inside 18.

A further feature of the invention resides broadly in the hydrodynamic torque converter 1 characterized by the fact that the recesses 29 of the stabilizer rings 19, 21, 23 are located on the side 31 facing the blades 8, 10, 12.

Another feature of the invention resides broadly in the hydrodynamic torque converter 1 characterized by the fact that the stabilizer ring 19, 21, 23 is preferably manufactured from a metal strip which is formed into a ring by connecting the two ends 27 of the metal strip.

Yet another feature of the invention resides broadly in the hydrodynamic torque converter 1 characterized by the fact that in places, the stabilizer rings 21, 23 have a varying radius 20 in the axial direction.

Still another feature of the invention resides broadly in the hydrodynamic torque converter characterized by the fact that at least one of the stabilizer rings 21 has an L-shaped cross section for the creation of an optimal flow path.

A further feature of the invention resides broadly in the hydrodynamic torque converter characterized by the fact that at least one of the stabilizer rings 23 has a U-shaped cross section for the creation of an optimal flow path.

Another feature of the invention resides broadly in the hydrodynamic torque converter characterized by the fact that the turbine wheel 9 and the reactor 11 are each provided with a stabilizer ring which has an L-shaped cross section 21.

Yet another feature of the invention resides broadly in the hydrodynamic torque converter characterized by the fact that the reactor 11 is provided with a U-shaped stabilizer ring 23 on the radial outside of the reactor blades 12.

Still another feature of the invention resides broadly in the hydrodynamic torque converter characterized by the fact that to simplify the manufacturing procedure, the U-shaped stabilizer ring 23 can be manufactured from two rings which have an L-shaped cross section, which two rings can be connected to one another on their longitudinal edges 31.

A further feature of the invention resides broadly in the hydrodynamic torque converter characterized by the fact that the varying radius 20 in the axial direction can be created by bending or rolling one or both of the longitudinal sides 31, 33 of the metal strip 25.

Another feature of the invention resides broadly in the hydrodynamic torque converter 1 characterized by the fact that the stabilizer ring 23 can be manufactured using casting technologies.

Yet another feature of the invention resides broadly in the hydrodynamic torque converter 1 characterized by the fact that the metal strip 25 of the stabilizer ring 19 of the pump wheel 7 is oriented essentially axially.

Examples of torque converters and components thereof which may be used in embodiments of the present invention can be found found in the following U.S. patents which are hereby incorporated by reference herein: U.S. Pat. No. 5,553,693; U.S. Pat. No. 5,515,956; and U.S. Pat. No. 5,462,145.

Additional examples of torque converters and components thereof which may be used in embodiments of the present invention can be found in the following U.S. patent applications which are hereby incorporated by reference herein: application Ser. No. 08/358,852, attorney docket number NHL-FIS-74, with inventors Uwe Dehrmann, Peter Volland, Wolfgang Kundermann, Hans Wilhelm Wienholt, Ruthard Knoblach and Herbert Schmid; application Ser. No. 08/436,108, attorney docket number NHL-FIS-113, with inventors Uwe Dehrmann, Peter Volland and Hans-Wilhelm Weinholt; application Ser. No. 08/527,760, attorney docket number NHL-FIS-151, with inventors Uwe Dehrmann, Peter Volland and Hans-Wilhelm Weinholt; application Ser. No. 08/541,061, attorney docket number NHL-FIS-152, with inventor Hans-Wilhelm Weinholt; application Ser. No. 08/568,267, attorney docket number NHL-FIS-160 US; with inventor Jorg Sudad; application Ser. No. 08/628,542, attorney docket number NHL-FIS-195; with inventor Rudiger Hinkel; and application Ser. No. 08/616,804, attorney docket number NHL-FIS-203, with inventor Rudiger Hinkel.

Additional examples of hydrokinetic torque converters and components thereof which may be used in embodiments of the present invention can be found in the following foreign patents: GB 442 363; DAS 1 068 080; DAS 1 284 802; DE-OS 28 50 577; and JP 3-144152.

Examples of hydrokinetic torque converters, and components thereof, which may be used in embodiments of the present invention, may be found in the following U.S. Pat.: No. 4,263,822: No. 3,953,970: No. 5,065,853: No. 4,468, 989: No. 4,382,496: and No. 4,071,125.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 39 814.9, filed on Oct. 26, 1995, having inventors Uwe Dehrmann, Wilfried Glock, Rudiger Hinkel, Ruthard Schneider, Peter Volland, Reinhold Weckesser, and Hans-Wilhelm Wienholt, and DE-OS 195 39 814.9 and DE-PS 195 39 814.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A hydrokinetic torque converter without an inside torus, comprising:

a pump wheel;

said pump wheel comprising a wall structure for directing fluid;

a turbine wheel;

said turbine wheel comprising a wall structure for directing fluid;

said hydrokinetic torque converter being disposed about a drive shaft of a motor vehicle, said shaft defining a longitudinal axis;

a fluid for transmitting torque between said pump wheel and said turbine wheel;

a stator to redirect flow of fluid within said hydrokinetic torque converter from said pump wheel to said turbine wheel;

said stator comprising a free-wheel mechanism to allow said stator to rotate with respect to at least one of said pump wheel and said turbine wheel and to allow said stator to remain stationary with respect to said at least one of said pump wheel and said turbine wheel;

said stator comprising a wall structure;

said pump wheel, said turbine wheel and said stator comprising wheels having blades for directing fluid;

said blades of said blade wheels comprising a first side and a second side, said second side extending from an outer periphery of the blade to an inner periphery of the blade;

said second side of said blades of said pump wheel each comprising a peripheral section;

said second side of said blades of said turbine wheel each comprising a peripheral section, said peripheral sections of said turbine wheel blades and said peripheral sections of said pump wheel blades being disposed substantially adjacent one another;

said second side of said blades of said pump wheel each comprising an interior section, said interior sections of said pump wheel blades each being disposed adjacent said stator;

said second side of said blades of said turbine wheel each comprising an interior section, said interior sections of said turbine wheel blades each being disposed adjacent said stator;

said interior sections being disposed adjacent the longitudinal axis;

said second side of each of said blades of said pump wheel comprising a center section disposed between said interior section and said peripheral section;

said second side of each of said blades of said turbine wheel comprising a center section disposed between said interior section and said peripheral section;

said peripheral sections of said blades being disposed further away from the longitudinal axis than said interior sections and said center sections of said blades;

said housing having a peripheral section;

said peripheral section of said housing being the portion of said housing being disposed furthest away from the longitudinal axis;

said peripheral sections of said blades being disposed adjacent said peripheral section of said housing;

each of said peripheral section, said interior section and said center section of each of said blades of said pump wheel and said turbine wheel comprising a substantial portion of said second side of each of said blades;

said blades of at least one of said blade wheels having its corresponding wall structure disposed along said first side of its corresponding blades;

said at least one of said blade wheels comprising at least one ring structure to stabilize the blades of said at least one of said blade wheels;

said at least one stabilizer ring being disposed to connect the individual blades of its corresponding blade wheel along said center section of said second side of its corresponding blades; and said at least one stabilizer ring being disposed and configured to permit a substantial portion of said center section of said second side of said blades of its corresponding blade wheel to be unsupported by said at least one stabilizer ring.

2. A hydrokinetic torque converter as claimed in claim 1 comprising:

said at least one stabilizer ring having an overall length, a circumferential perimeter and a thickness;

said thickness of said at least one stabilizer ring being substantially smaller than either of said overall length and said circumferential perimeter;

said second side of said blades comprising an edge;

a portion of said at least one stabilizer ring intersecting said edge of said second side of said blade;

the length of said portion of said edge of the blade corresponding to said intersecting portion of said at least one stabilizer ring is very substantially less than the length of said edge of said blade;

an axis of rotation;

said blades of said turbine wheel having a radial length in a direction substantially transverse to said axis of rotation;

said blades of said pump wheel having a radial length in a direction substantially transverse to said axis of rotation; and said overall length of said at least one stabilizer ring is substantially smaller than said radial length of said blades of said turbine wheel and said blades of said pump wheel.

3. A hydrokinetic torque converter as claimed in claim 2 wherein:

said at least one stabilizer ring comprises a substantially straight portion substantially parallel to said axis of rotation; and said substantially straight portion is a substantial portion of said at least one stabilizer ring.

4. A hydrokinetic torque converter as claimed in claim 3 wherein:

said pump wheel and said turbine wheel each comprise a wheel for transmitting power;

said at least one stabilizer ring being disposed on at least one of said power transmitting wheels;

each of said blades of said power wheels comprise a first power blade portion proceeding radially from the end of the blade furthest from said axis of rotation along the radial length toward said axis of rotation;

each of said blades of said power wheels comprise a second power blade portion deviating from a radial direction from the end of said first power blade portion nearest said axis of rotation;

said second power blade portion comprises a first end and a second end;

said first end of said second power blade portion abuts said first power blade portion;

said at least one stabilizer ring is adjacent a part of said second power blade portion; and said at least one stabilizer ring is disposed a substantial distance away from the intersection of said first power blade portion and said second power blade portion thus forming a substantial gap between said at least one stabilizer ring and said intersection of said first power blade portion and said second power blade portion.

5. A hydrokinetic torque converter as claimed in claim 3 wherein:

said pump wheel and said turbine wheel each comprise a wheel for transmitting power;

said at least one stabilizer ring being disposed on at least one of said power transmitting wheels;

each of said blades of said power wheels comprise a first power blade portion proceeding radially from the end of the blade furthest from said axis of rotation along the radial length toward said axis of rotation;

each of said blades of said power wheels comprise a second power blade portion deviating from a radial direction from the end of said first power blade portion nearest said axis of rotation;

said second power blade portion comprises a first end and a second end;

said first end of said second power blade portion abuts said first power blade portion;

said at least one stabilizer ring is adjacent a part of said second power blade portion; and said at least one stabilizer ring is disposed a substantial distance away from said second end of said second power blade portion thus forming a substantial gap between said at least one stabilizer ring and said second end of said second power blade portion.

6. A hydrokinetic torque converter without an inside torus comprising blade wheels in the form of a reactor, pump wheel and turbine wheel, each of said blade wheels comprising individual blades, said individual blades of each of said blade wheels being connected by a corresponding outer wall, a hydraulic medium disposed to transmit a torque from the pump wheel to the turbine wheel, said hydraulic medium being disposed to flow along a flow path from the pump wheel to the turbine wheel and is returned to the pump wheel via the reactor, wherein:

an exposed side of each of said pump wheel and said turbine wheel comprising:

a peripheral section;

said peripheral sections of said pump wheel blades and said trubine wheel blades being disposed substantially adjacent one another;

an interior section, said interior sections of said pump wheel blades and said turbine wheel blades each being disposed adjacent said stator;

a center section disposed between said interior section and said peripheral section; and each of said peripheral section, said interior section and said center section of each of said blades of said pump wheel and said turbine wheel comprising a substantial portion of said exposed side of each of said blades, at least one of said blade wheels comprises at least one stabilizer ring which at least one stabilizer ring is disposed to connect the individual blades of said at least one of said blade wheels on the center sections of their exposed sides and by means of which the flow path of the hydraulic medium can be influenced to reduce flow losses, said at least one stabilizer ring being disposed and configured so that a substantial portion of said center section of said exposed sides of said blades of said corresponding blade wheel are unsupported by said at least one stabilizer ring.

7. A hydrokinetic torque converter as claimed in claim 6 wherein:

corresponding to said at least one stabilizer ring there is a second stabilizer ring which is disposed to connect the individual blades of a second of said blade wheels on their exposed side; and corresponding to at least one of said at least one stabilizer ring and said second stabilizer ring there is an additional stabilizer ring which is disposed to connect the individual blades of the third of the blade wheels and wherein the stabilizer ring of the reactor is connected to a radial outside of the reactor blades.

8. A hydrokinetic torque converter as claimed in claim 7 wherein at least one of said reactor and said turbine wheel comprise L-shaped stabilizer rings.

9. A hydrokinetic torque converter as claimed in claim 7 wherein one of said stabilizer rings is a U-shaped stabilizer ring.

10. A hydrokinetic torque converter as claimed in claim 9 wherein the reactor is provided with said U-shaped stabilizer ring on the radial outside of the reactor blades.

11. A hydrokinetic torquer converter as claimed in claim 10 wherein said U-shaped stabilizer ring comprises two L-shaped stabilizer rings abutting one another.

12. A hydrokinetic torque converter as claimed in claim 7 wherein said at least one stabilizer ring comprises a metal strip and has a varying radius in the axial direction; and said varying radius in the axial direction is configured by bending or rolling one or both of the longitudinal sides of the metal strip.

13. A hydrokinetic torque converter as claimed in claim 6 wherein:

said at least one stabilizer ring is provided with recesses which are provided for the positive holding of blades of the blade wheels; and said recesses are disposed on the side of said at least one stabilizer ring which faces the blades.

14. A hydrokinetic torque converter as claimed in claim 6 wherein at least one of said at least one stabilizer rings has an L-shaped cross section for the creation of an optimal flow path.

15. A hydrokinetic torque converter as claimed in claim 6 wherein said at least one stabilizer ring comprises a cast ring.

16. A hydrokinetic torque converter as claimed in claim 6 wherein:

said at least one stabilizer ring comprises at least one metal strip;

said metal strip comprises a first end and a second end; and said first end and said second end abut one another.

17. A hydrokinetic torque converter without an inside torus, comprising:

a housing;

a pump wheel;

said pump wheel comprising a wall structure for directing fluid;

said wall structure of said pump wheel comprising a portion of said housing;

a turbine wheel;

said turbine wheel comprising a wall structure for directing fluid;

said pump wheel and said turbine wheel defining a longitudinal axis and being disposed to rotate about the longitudinal axis;

a fluid for transmitting torque between said pump wheel and said turbine wheel;

a stator to redirect flow of fluid within said hydrokinetic torque converter;

said stator comprising a free-wheel mechanism to allow said stator to rotate with respect to at least one of said pump wheel and said turbine wheel;

said stator comprising a wall structure;

said pump wheel, said turbine wheel and said stator comprising wheels having blades for directing fluid;

said blades of said pump wheel and said turbine wheel each comprising a first side and a second side;

said second side of said blades of said pump wheel each comprising a peripheral section;

said second side of said blades of said turbine wheel each comprising a peripheral section, said peripheral sections of said turbine wheel blades and said peripheral sections of said pump wheel blades being disposed substantially adjacent one another;

said second side of said blades of said pump wheel each comprising an interior section, said interior sections of said pump wheel blades each being disposed adjacent said stator;

said second side of said blades of said turbine wheel each comprising an interior section, said interior sections of said turbine wheel blades each being disposed adjacent said stator;

said interior sections of said second side of said pump wheel blades and said turbine wheel blades each being disposed adjacent the longitudinal axis;

said second side of each of said blades of said pump wheel each comprising a center section disposed between said interior section and said peripheral section;

said second side of each of said blades of said turbine wheel each comprising a center section disposed between said interior section and said peripheral section;

said peripheral sections of said second side of each of said blades of said pump wheel and each of said blades of said turbine wheel being disposed further away from the longitudinal axis than said interior sections and said center sections of said blades;

said housing having a peripheral section;

said peripheral section of said housing being the portion of said housing being disposed furthest away from the longitudinal axis;

said peripheral sections of said blades being disposed adjacent said peripheral section of said housing;

each of said peripheral section, said interior section and said center section of said second side of each of said blades of said pump wheel and said turbine wheel comprising a substantial portion of each of said blades;

said blades of at least one of said pump wheel and said turbine wheel having its corresponding wall structure disposed along said first side of its corresponding blades;

said at least one of said pump wheel and said turbine wheel comprising at least one ring structure to stabilize the blades of said at least one of said pump wheel and said turbine wheel;

said at least one stabilizer ring structure being disposed to connect the individual blades of its corresponding blade wheel along said center section of said second side of its corresponding blades; and said at least one stabilizer ring being disposed and configured so that a substantial portion of said center sections of said second sides of said blades of said corresponding blade wheel are unsupported by said at least one stabilizer ring.

18. The hydrokinetic torque converter according to claim 17 wherein said at least one stabilizer ring comprises a metal strip.

19. The hydrokinetic torque converter according to claim 18 wherein:

said metal strip has first and second ends;

said first and second ends of said metal strip are disposed adjacent to one another; and said first and second ends of said metal strip are connected to one another to form said at least one stabilizer ring.

20. The hydrokinetic torque converter according to claim 19 wherein said metal strip has an L-shaped cross section.

* * * * *

UNITED STATES PATENT AND TRADEMARK OFFICE
CERTIFICATE OF CORRECTION

PATENT NO. : 5,813,227
DATED      : September 29, 1998
INVENTOR(S) : Uwe DEHRMANN, Wilfried GLOCK, Rüdiger HINKEL,
              Ruthard SCHNEIDER, Peter VOLLAND, Reinhold WECKESSER,
              and Hans-Wilhelm WIENHOLT It is certified that error appears in the above-identified patent and that said Letters Patent is hereby corrected as shown below:

On the title page, item [56], under the FOREIGN PATENT DOCUMENTS section, before '3/1995', delete "70873308" and insert --7083308--.

In column 12, line 47, Claim 11, after 'hydrokinetic', delete "torquer" and insert --torque--.

Signed and Sealed this

First Day of June, 1999

Attest:

Q. TODD DICKINSON

*Attesting Officer*    *Acting Commissioner of Patents and Trademarks*